US010807621B2

(12) United States Patent
Zhang et al.

(10) Patent No.: US 10,807,621 B2
(45) Date of Patent: Oct. 20, 2020

(54) TRAIN PANTOGRAPH STRUCTURAL HEALTH MONITORING SYSTEM

(71) Applicant: Broadsens Corp., Milpitas, CA (US)

(72) Inventors: Chang Zhang, San Jose, CA (US); Lei Liu, San Ramon, CA (US)

(*) Notice: Subject to any disclaimer, the term of this patent is extended or adjusted under 35 U.S.C. 154(b) by 381 days.

(21) Appl. No.: 15/873,820

(22) Filed: Jan. 17, 2018

(65) Prior Publication Data

US 2018/0208222 A1    Jul. 26, 2018

Related U.S. Application Data

(60) Provisional application No. 62/449,126, filed on Jan. 23, 2017.

(51) Int. Cl.
*B61L 15/00* (2006.01)
*B61L 27/00* (2006.01)

(52) U.S. Cl.
CPC ....... *B61L 15/0081* (2013.01); *B61L 15/0027* (2013.01); *B61L 15/0072* (2013.01); *B61L 27/0094* (2013.01)

(58) Field of Classification Search
CPC ............. B61L 15/0081; B61L 15/0027; B61L 15/0072; B61L 27/0094
See application file for complete search history.

(56) References Cited

U.S. PATENT DOCUMENTS

| 5,115,405 A * | 5/1992 | Cathala | B60L 5/32 700/275 |
| 2007/0000744 A1 * | 1/2007 | Craig | B60L 5/205 191/2 |
| 2009/0173840 A1 * | 7/2009 | Brown | B61L 15/0027 246/1 R |
| 2010/0322465 A1 * | 12/2010 | Wesche | B60L 5/24 382/100 |
| 2013/0320154 A1 * | 12/2013 | Brown | B61G 5/06 246/169 A |

(Continued)

FOREIGN PATENT DOCUMENTS

| CN | 2936870 Y * | 8/2007 | |
| CN | 102255956 A * | 11/2011 | |
| WO | WO-2012073266 A1 * | 6/2012 | ................ B60L 5/32 |

*Primary Examiner* — Donald J Wallace
(74) *Attorney, Agent, or Firm* — Jigang Jin

(57) ABSTRACT

The present invention discloses a train pantograph structural health monitoring system. The system includes one or more sensors mounted to or integrated with the train pantograph, a data acquisition unit for receiving signal or data from the sensors, and a processing unit for determining the train pantograph's structural health based on the received signal or data. Inspections via the system can be performed in real time continuously or periodically while a train is in service. It can also be performed offline while a train is not in service. Inspection method can be either passive, where sensors collect signals without generating excitation signals to the structure, or active, where some sensors are used as actuators to actively send excitation signals to the structure and other sensors or the actuators themselves collect the structural response signals. The data acquisition unit receives signals or data from sensors. The processing unit processes sensor data acquired by the data acquisition unit and determines if there are structural changes or damages.

14 Claims, 2 Drawing Sheets

(56) References Cited

U.S. PATENT DOCUMENTS

| | | | |
|---|---|---|---|
| 2017/0210401 A1* | 7/2017 | Mian | B61L 15/0081 |
| 2018/0162423 A1* | 6/2018 | Zhang | B61L 15/0072 |
| 2018/0223746 A1* | 8/2018 | Mack | B61C 17/12 |
| 2019/0126777 A1* | 5/2019 | Pasquale | B60L 5/26 |
| 2020/0055401 A1* | 2/2020 | Sun | B60L 5/205 |

* cited by examiner

TRAIN PANTOGRAPH STRUCTURAL HEALTH MONITORING SYSTEM

CROSS-REFERENCE TO RELATED APPLICATION

This application claims priority to U.S. provisional patent application Ser. No. 62/449,126, filed Jan. 23, 2017, the entire content of which is incorporated herein by reference.

FIELD OF INVENTION

This invention generally relates to the field of structural health monitoring ("SHM").

BACKGROUND OF THE INVENTION

A pantograph is an apparatus mounted on the roof of an electric train, tram, or electric bus to collect power through contact with an overhead catenary wire. Pantographs with overhead wires are now the dominant form of current collection for modern electric trains. Therefore, a pantograph is a critical structure for the safe operation of modern trains. Structural failure of the pantograph can cause serious accidents. When a pantograph is damaged or worn out, the pantograph can tear down the cable. It requires costly and time-consuming repairs and may lead to significant downtime. Torn high voltage cables also pose danger to passengers and personnel nearby. Therefore, it is critical to ensure that the pantograph is in healthy working condition.

Currently, pantograph structural health is inspected offline through a visual inspection system. The visual inspection system takes images of the pantographs and uses image analysis algorithms to determine if there are damages in the pantograph structure. The visual inspection system can find thickness changes in carbon strips and external defects of the structure. However, it cannot effectively detect soldering joint failures, metal fatigues, internal damages, or damages located at the camera's blind spots. Further manual inspections are then required to check damages of the pantograph. Therefore, an effective method to inspect pantograph structure that saves labor cost and improves efficiency and accuracy is desirable.

SUMMARY OF THE INVENTION

The present invention discloses a structural health monitoring system that uses in-situ sensors to monitor a train pantograph's structure integrity. The system detects structural damages such as soldering joint failure, metal fatigue, or cracks on the frame.

In one embodiment, the train pantograph structural health monitoring system includes one or more sensors mounted to or built in as part of the train pantograph, a data acquisition unit for receiving signal or data from the sensors, and a processing unit for determining the train pantograph's structural health based on the received signal or data. Inspections via the system can be performed in real time continuously or periodically while a train is in service. It can also be performed offline while a train is not in service.

In one embodiment, inspections via the train pantograph structural health monitoring system can be either passive, where sensors collect signals without generating excitation signals to the structure, or active, where some sensors are used as actuators to actively send excitation signals to the structure and other sensors or the actuators themselves collect the structural response signals, or the combination of passive and active sensors. The data acquisition unit receives signals or data from sensors. In the active mode, the data acquisition unit also generates actuation signals to actuators. The processing unit processes the acquired sensor data to determine if there are structural changes or damages.

BRIEF DESCRIPTION OF THE DRAWINGS

The subject matter, which is regarded as the invention, is particularly pointed out and distinctly claimed in the claims at the conclusion of the specification. The foregoing and other features and also the advantages of the invention will be apparent from the following detailed description taken in conjunction with the accompanying drawings. Additionally, the leftmost digit of a reference number identifies the drawing in which the reference number first appears.

DETAILED DESCRIPTION

Figure 1:
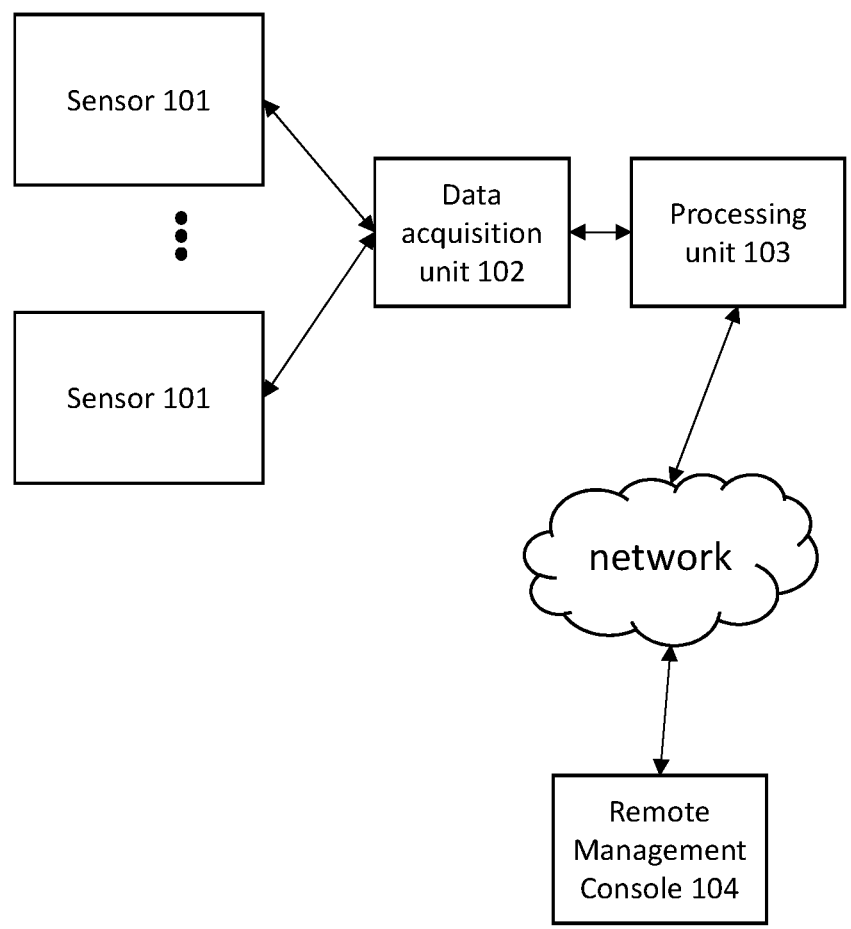
FIG. 1 is a simplified block diagram of a train pantograph structural health monitoring system, according to one embodiment of the present invention.

This present invention discloses a structural health monitoring system 100 for train pantographs. In one embodiment, as shown in FIG. 1, the system 100 comprises one or more sensors 101, a data acquisition unit 102 and a processing unit 103. Each sensor 101 may be an actuator (i.e., active sensor), a receiver (i.e., passive sensor), or a combination of both. Inspections via the system 100 can be performed in real time continuously or periodically while a train is in service. It can also be performed offline while a train is not in service. Inspection method can be passive, active, or the combination of both. In passive mode, sensors collect signals without generating excitation signals to the structure. In active mode, some sensors can be used as actuators, which actively send excitation signals to the structure, whereas other sensors or the actuators themselves collect the structural response signals. The data acquisition unit 102 receives signals or data from sensors 101. In active mode, the data acquisition unit 102 also generates actuation signals to actuators. The processing unit 103 processes sensor data acquired by the data acquisition unit 102 and determines if there are structural changes or damages.

The sensors 101 can be either mounted to the pantograph or directly built in as part of the pantograph. The mounting methods include epoxy, glues, screws, clamps, or other methods. The sensors 101 may have different sensing capabilities. For example, the sensors 101 can be piezoelectric sensors, EMAT (Electro Magnetic Acoustic Transducers), accelerators, gyroscopes, temperature sensors, fiber optic sensors or strain gauges. There may also be a combination of sensors with different sensing capabilities. Some sensors can also be used as actuators in the active mode.

The sensors 101, data acquisition unit 102, and/or processing unit 103 can be integrated together or separate devices. For example, the data acquisition unit 102 may be integrated with some sensors 101 as a single device. As another example, the data acquisition unit 102 may be integrated with the processing unit 103 as a single device. But when the amount of data to be processed is huge or certain complex data processing algorithm (e.g., artificial intelligence, machine learning) is needed, a remote (e.g., cloud-based) and more powerful processing unit 103 may be used instead.

In one embodiment, the system 100 may also include a remote management console 104 for sending instructions to the data acquisition unit 102 and/or the processing unit 103 to coordinate these units and receiving data and/or structural health results from these units over a wired or wireless network. The remote management console 104 may be installed on the train or at a control center off the train.

Because of high voltage on the pantograph, it may be difficult to connect what is mounted to the pantograph to the rest of the system 100 on the train via wired connections. In such case, wireless communication is used. One example is to have the sensors 101 and the data acquisition unit 102 mounted to the pantograph and the processing unit 103 installed at a location with low voltage (for example, 24V DC) on the train, and the data acquisition unit 102 communicates with the processing unit 103 wirelessly, which in turn communicates with the remote management console 104 via a wired connection or wirelessly depending on the console's location. Another example is to have the sensors 101, the data acquisition unit 102 and the processing unit 103 all mounted to the pantograph, and the processing unit 103 communicates with the remote management console 104 wirelessly.

When they are separate devices, the data acquisition unit 102 can connect to the sensors 101 either by wires or wirelessly. When the connection is wired, the wires can be but are not limited to shielded, unshielded, coaxial or twisted-pair, USB cable, Ethernet cable, or other connections. When the connection is wireless, the wireless mode can be but are not limited to ZigBee, Wi-Fi, or mobile data network. Signals or data transferred between sensors 101 and data acquisition unit 102 can be analog or digital.

Similarly, when they are separate devices, the processing unit 103 can connect to the data acquisition unit 102 either by wires or wirelessly. When the connection is wired, the wires can be but are not limited to USB cable, Ethernet cable, CAN, RS485, or other connections. When the connection is wireless, the wireless mode can be but are not limited to ZigBee, Wi-Fi, mobile data network, or other wireless networks.

Figure 2:
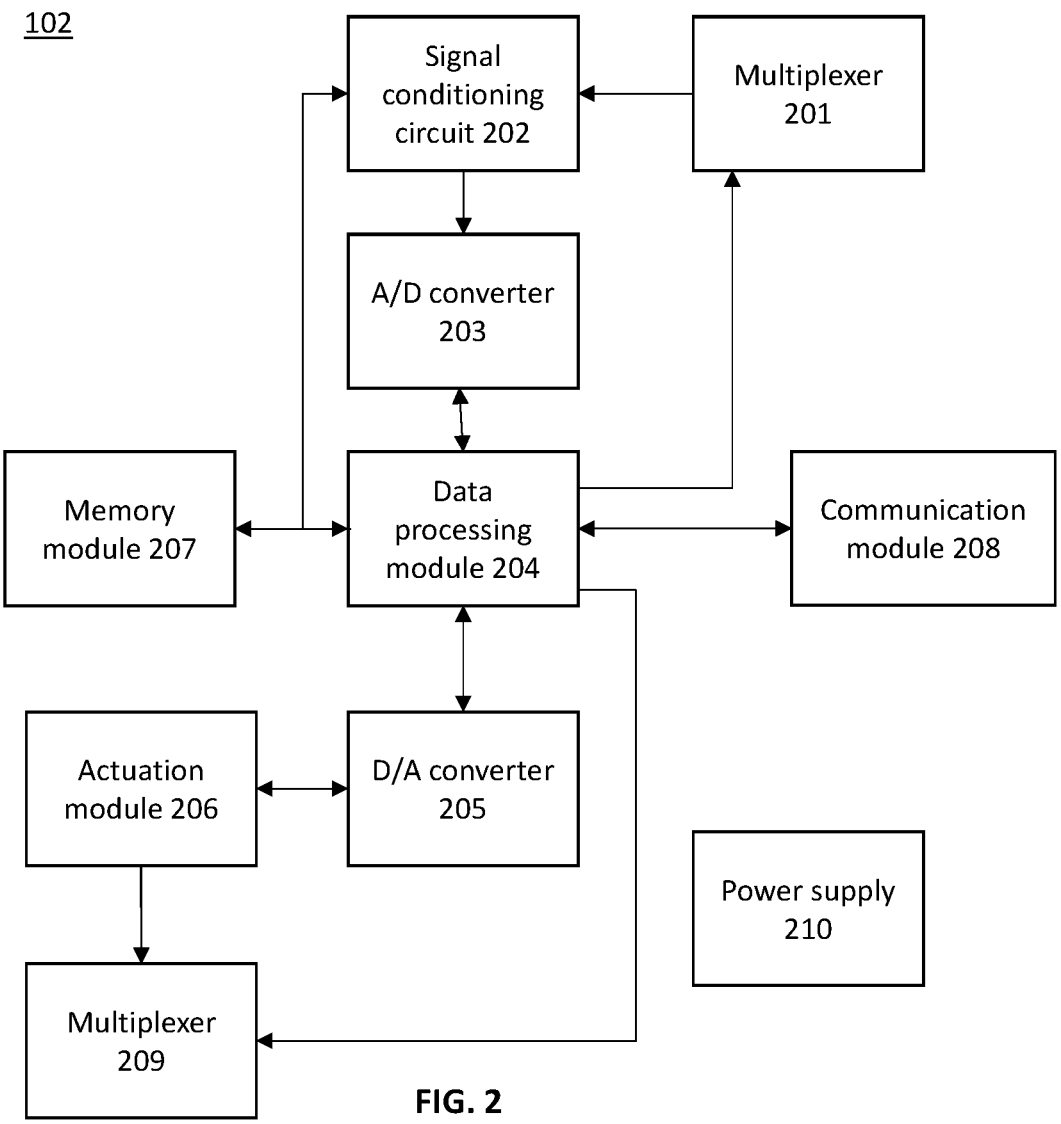
FIG. 2 is a simplified block diagram of a data acquisition unit of a train pantograph structural health monitoring system, according to one embodiment of the present invention.

As shown in FIG. 2, the data acquisition unit 102 may include a multiplexer 201 for listening signals from multiple sensors, a signal conditioning circuit 202 that amplifies signal level and filter out unwanted environment noise, an A/D converter 203 that converts analog signals to digital signals, a data processing module 204 that processes signals through digital filtering or feature extraction, a D/A converter 205 that converts digital signals to analog signals, an actuation module 206 that generates actuation signals and sends the signals to the actuators, a memory module 207 that stores data, a communication module 208, a multiplexer 209 for choosing from multiple actuators for sending the actuation signals, and a power supply 210 for supplying power to the various components described above. Note that the data acquisition unit 102 may have various configurations, where certain components are optional.

In one embodiment, the communication module 208 connects with a remote-control center so that the data acquisition unit 102 could be remotely configured from the control center. In addition, the communication module 208 may also supports communications between the data acquisition unit 102 with digital sensors. Such communications could be achieved via USB, Ethernet, ZigBee, CAN, Wi-Fi, mobile data network, or other digital connection method.

In another embodiment, the data acquisition unit 102 and the processing unit 103 are integrated as a single device. In this case, the data processing module 204 could be replaced by the processing power of the processing unit 103.

Note that multiplexer 201 and multiplexer 209 may be combined into one multiplexer module which is controlled by the data processing module 204 in terms of which sensor or actuator is chosen for receiving signals from or sending excitation signals to.

In one embodiment of the invention, the sensors are piezoelectric ceramic sensors, and ultrasonic scans are used to inspect the structural health. The data acquisition unit has an actuation module that sends excitation signal to the sensors. The excitation signal can be a pulse, a lamb wave signal, or other types of signals. The piezoelectric sensor converts the electric signal to a mechanic wave that travels through the surface and interior of the pantograph. In one case, the piezoelectric sensor used for transmission works in pulse echo mode, in which the sensor itself also picks up the reflection of the waves and converts the mechanical wave back to electric signal. In another case, other piezoelectric sensors pick up the mechanical waveform and convert it back to electric signal. When there are structural damages, the signal pattern, such as amplitude, phase, or frequency, can be different from the pattern when the pantograph is in normal condition. By analyzing the changes of the waveform patterns, the location and size of the damage can be identified.

In another embodiment of the invention, the sensors are piezoelectric ceramic sensors and vibration monitoring is used to inspect the structural health. In this case, no actuation module is required for the piezoelectric ceramic sensors. The piezoelectric ceramic sensors measure vibration, shock, and movement of the pantograph. When there is an anomaly, the movement of the parts can behave differently from the normal condition. For example, in the frequency domain, the frequency response and amplitude are different from a normal condition. By analyzing at the signal change in the time domain and frequency domain, the damages can be identified.

In another embodiment of the invention, accelerators and/or gyroscopes are used to measure the movement of the critical parts of the pantograph. By analyzing the difference between the movements in normal working status and in damaged condition, the structural damages can be identified.

In another embodiment of the invention, strain gauges are attached to the frame of the pantograph to measure the static and/or dynamic strain on the frame. When there is a defect, the static and dynamic response of the frame will change in terms of frequency and amplitude.

In another embodiment of the invention, the temperature sensor is attached to the pantograph to gather environment information for calibration. Since the structure response is affected by temperature, temperature measurement is used to get the structure response at different temperature levels for more accurate damage detection. The temperature sensor type can be, but is not limited to, Resistance Temperature Detector (RTD), thermocouple or semiconductor-based sensors.

It is worth noting that one or more of the above sensors can be combined to provide a comprehensive structural health monitoring of the pantograph.

The sensors, the data acquisition unit, and/or the processing unit may each have a built-in battery. To make the device self-sufficient, an energy harvesting circuit can also be added to harvest the energy when the train is in operation. The energy can be harvested by using piezoelectric sensors that convert mechanical energy from the train vibration/movement into electrical energy.

The data acquisition unit and/or the processing unit may include a memory module, which saves the acquired data and processed result. The data acquisition unit and/or the processing unit may include a communication module for network connection. The connection can be but are not limited to USB, Ethernet, ZigBee, CAN, Wi-Fi, mobile data network, or other connection method.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments. Furthermore, it is intended that the appended claims cover any and all such applications, modifications, and embodiments within the scope of the present invention.

We claim:

1. A structural health monitoring system for a high-voltage train pantograph, the system comprising:
   a plurality of sensors, which are mounted to or integrated with the high-voltage train pantograph;
   a data acquisition unit mounted to the high-voltage train pantograph for receiving a signal or data from the plurality of sensors, wherein the data acquisition unit sends an excitation signal to the train pantograph through at least one of the sensors and collects a response from the train pantograph through at least one of the sensors; and
   a processing unit for determining the train pantograph's structural health based on the received signal or data, wherein the processing unit is installed at a low-voltage location off the high-voltage train pantograph, and the data acquisition unit and the processing unit communicate via a wireless connection.

2. The system of claim 1, wherein the data acquisition unit sends an ultrasonic excitation signal to the train pantograph through at least one of the sensors and collects the response from the train pantograph through at least one of the sensors.

3. The system of claim 1, wherein the sensors are mounted to the train pantograph in-situ by means of epoxy, clamps, glue, screws, or other mounting means.

4. The system of claim 1, wherein one of the sensors is used to measure vibration, shock, and/or movement of the train pantograph to determine the train pantograph's structural health.

5. The system of claim 1, wherein the processing unit communicates wirelessly with a remote management console.

6. The system of claim 1, wherein the sensors comprise a piezoelectric sensor, an accelerator, a gyroscopic sensor, a temperature sensor, an EMAT (Electro Magnetic Acoustic Transducer), a fiber optic sensor, or a strain gauge.

7. The system of claim 1, wherein the sensors and the data acquisition unit are integrated as a single device.

8. The system of claim 1, wherein one of the sensors is used to measure static and/or dynamic strain on a frame of the train pantograph to determine the train pantograph's structural health.

9. The system of claim 1, wherein the sensors are powered by the data acquisition unit.

10. The system of claim 1, wherein at least one of the sensors, the data acquisition unit, and the processing unit is powered by a built-in battery.

11. The system of claim 1, further includes an energy harvesting circuit that supplies power to the system.

12. The system of claim 1, wherein an inspection via the system is performed in real time continuously or periodically.

13. The system of claim 1, further includes a remote management console for sending instructions to the data acquisition unit and the processing unit to coordinate these units and for receiving data and structural health results from these units over a network.

14. The system of claim 1, wherein the data acquisition unit includes a first multiplexer, a signal conditioning circuit, an A/D converter, a data processing module, a D/A converter, an actuator module, a memory module, a communication module, a second multiplexer, and/or a power supply.

* * * * *